(12) United States Patent
Voss et al.

(10) Patent No.: US 6,880,742 B2
(45) Date of Patent: Apr. 19, 2005

(54) SEPARATING SEAM WELDING DEVICE

(75) Inventors: Hans-Ludwig Voss, Tecklenburg (DE); Friedrich Goecker, Espelkamp (DE)

(73) Assignee: Windmoeller & Hoelscher KG, Lengerich (DE)

( * ) Notice: Subject to any disclaimer, the term of this patent is extended or adjusted under 35 U.S.C. 154(b) by 131 days.

(21) Appl. No.: 10/448,199

(22) Filed: May 30, 2003

(65) Prior Publication Data

US 2003/0226824 A1 Dec. 11, 2003

(30) Foreign Application Priority Data

Jun. 10, 2002 (DE) .......................... 102 25 757
Jul. 13, 2002 (DE) .......................... 102 31 770

(51) Int. Cl.[7] .................. B23K 37/00; B23K 11/00
(52) U.S. Cl. .................. 228/5.5; 228/4.1; 228/5.1; 228/13; 228/106; 228/141.1; 228/160; 228/170; 219/78.15; 219/121.18; 219/121.39; 219/121.67; 219/124.21
(58) Field of Search .................. 228/4.1, 5.1, 5.5, 228/13, 106, 141.1, 160, 170; 219/78.15, 121.18, 121.39, 121.67, 124.21

(56) References Cited

U.S. PATENT DOCUMENTS

| | | | | |
|---|---|---|---|---|
| 3,817,815 A | * | 6/1974 | Sendor et al. .......... 156/583.4 |
| 3,823,528 A | * | 7/1974 | Janssen .................... 53/586 |
| 4,551,965 A | * | 11/1985 | Prottengeier .............. 53/463 |
| 4,905,310 A | * | 2/1990 | Ulrich .................. 219/121.64 |
| 5,532,451 A | * | 7/1996 | La Rocca .............. 219/121.64 |

FOREIGN PATENT DOCUMENTS

| | | |
|---|---|---|
| CH | 530 905 | 1/1973 |
| CH | 587 751 | 5/1977 |
| DE | 39 20 867 | 1/1990 |
| DE | 90 05 376.1 | 9/1990 |
| EP | 0 888 876 | 1/2002 |

* cited by examiner

Primary Examiner—Lynne R. Edmondson
(74) Attorney, Agent, or Firm—Jacobson Holman PLLC

(57) ABSTRACT

Shown is a device and a process for the simultaneous separating and welding of foils or foil tubes (5) where the device comprises at least one welding terminal (2) and an opposing terminal (3), and at least a part of the surface of the opposing terminal (3) turned toward the welding terminal (2) is equipped with a flexible absorbing body (4).

Figure 1:
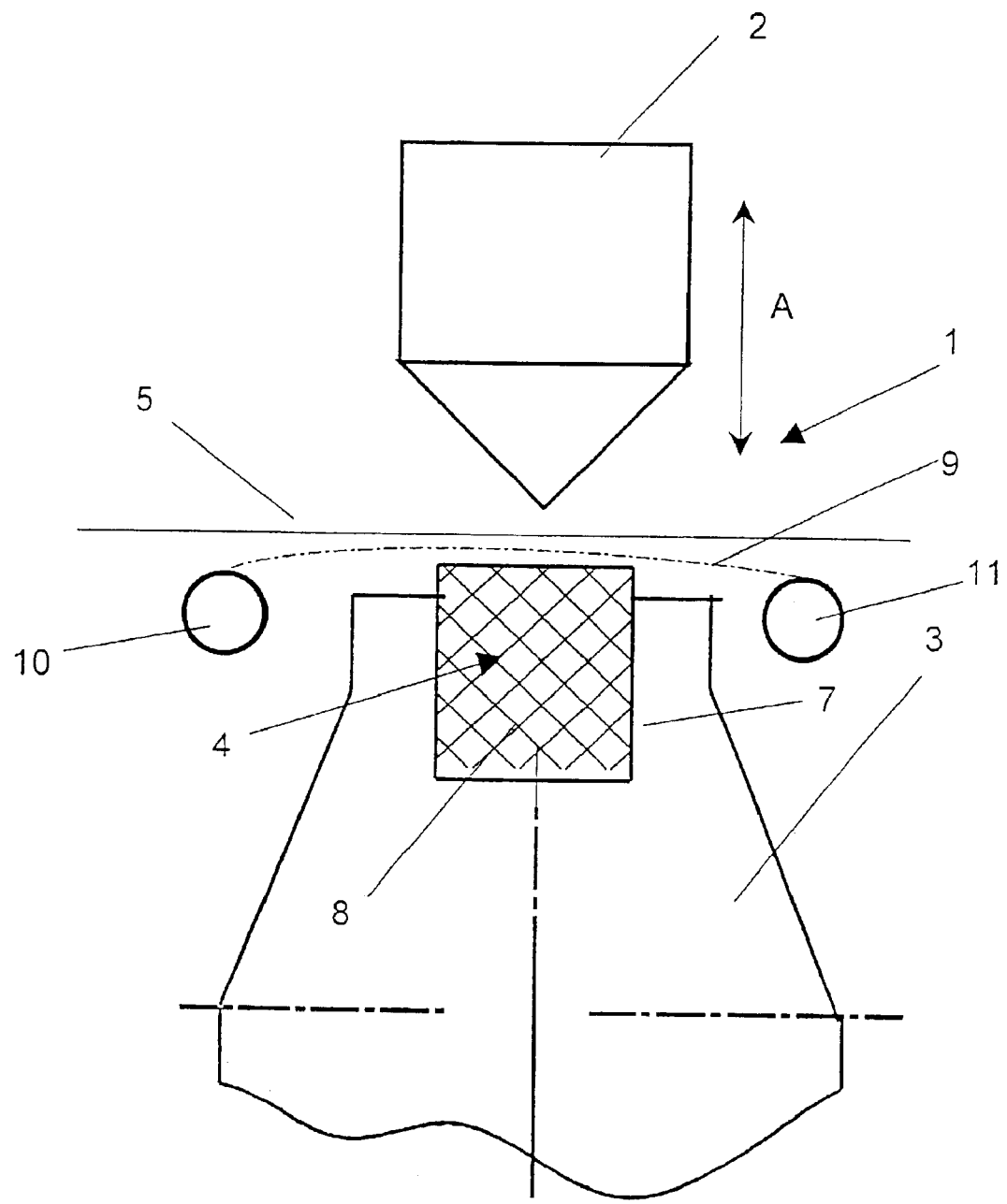

It is inventive that the surface of the absorbing body (6) turned toward the welding terminal consists of metal.

11 Claims, 4 Drawing Sheets

SEPARATING SEAM WELDING DEVICE

The invention relates to a device for the simultaneous separating and welding of foils or foil tubes which comprise at least one welding terminal and one opposing terminal.

Such devices are used, as a rule, in order to produce bags from foil tubes. In the welding process the welding terminal and the opposing terminal are pressed together. In so doing, a separating cut as well as welding seams arise as mentioned, which accelerates the production process. Among others, EP 0 888 876 B1 shows such a separating/welding device with a welding terminal and an opposing terminal.

As a rule, the opposing terminal is protected from the material to be welded by a Teflon/glass fabric. This fabric prevents the adhesion of the foil to the opposing terminal. As a rule, the Teflon/glass fabric is moved past the opposing terminal. In this process the motion is intermittent since the Teflon/glass fabric cannot be moved during the welding process. The forces as well as the temperatures to which the welding terminal and the opposing terminal are exposed cause wear. Thus, these elements are often provided with spring elements which are connected to the terminals and their suspensions. Another method to limit the wear consists of the use of a rotatable opposing terminal. These rotatable opposing terminals are, as a rule, shaped as rollers. Between two separating/welding processes the roller is turned so that another part of the roller surface is exposed to the welding temperature and the pressure of the separating/welding process. Often these rotatable opposing terminals are also protected by a Teflon/glass fabric against adhesion of the welded foil. Due to the rotation of the described opposing terminal it is often sufficient to coat the opposing terminal with the Teflon/glass fabric. In recent years all the already cited forms of embodiment of opposing terminals in the range of applications described have been equipped with flexible absorbing bodies which cover at least a part of the surface of the opposing terminal turned toward the welding terminal. In said forms of embodiment these absorbing bodies, as a rule, consist of silicone, viton, or another flexible and temperature-resistant material. These materials do indeed reduce the wear of the terminals but wear very quickly themselves. Due to the exchange of these absorbing bodies or even of the entire welding terminal however, undesired downtimes of the machine result.

It is the objective of the present invention to reduce these downtimes.

This objective is realized by the fact that the surface of the absorbing body turned toward the welding terminal consists of metal.

Metals have, as a rule, a higher thermal conductivity and resistance to friction than the materials previously used in the flexible absorbing bodies. If the material used is flexible, a part of the restoring force to be applied by the absorbing body can be applied directly by the metal. Prestressed spring steel sheets are particularly well suited in this connection. On the side turned away from the welding terminal during the welding process, spring elements can be mounted. These can apply the absorbing action and the restoring force alone or, for example, together with a spring steel sheet.

Additional embodiment examples of the invention follow from the description of the object and the claims.

The individual figures show:

FIG. 1 a schematic diagram of a welding/separating device

Figure 2:
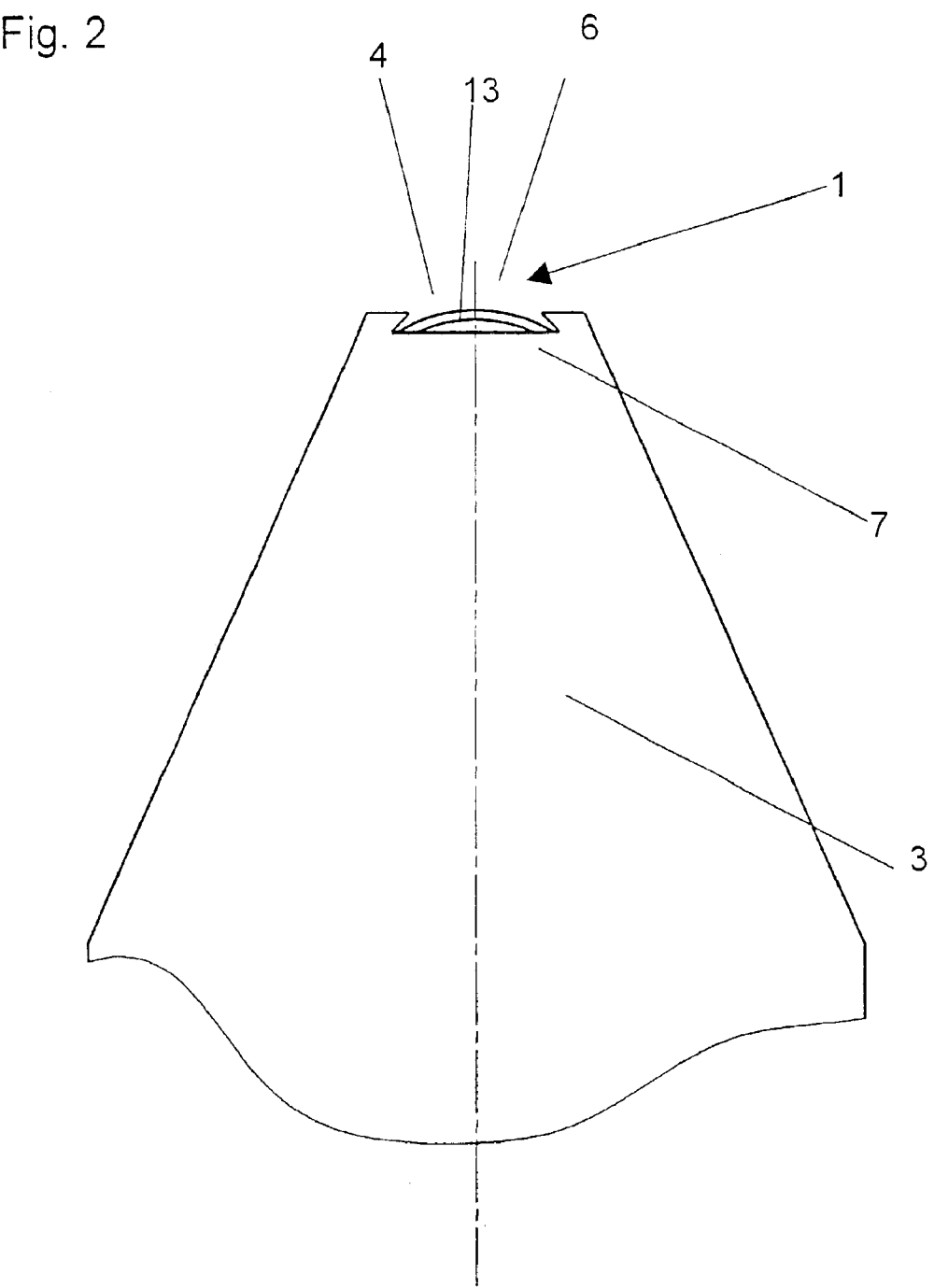
Figure 3:
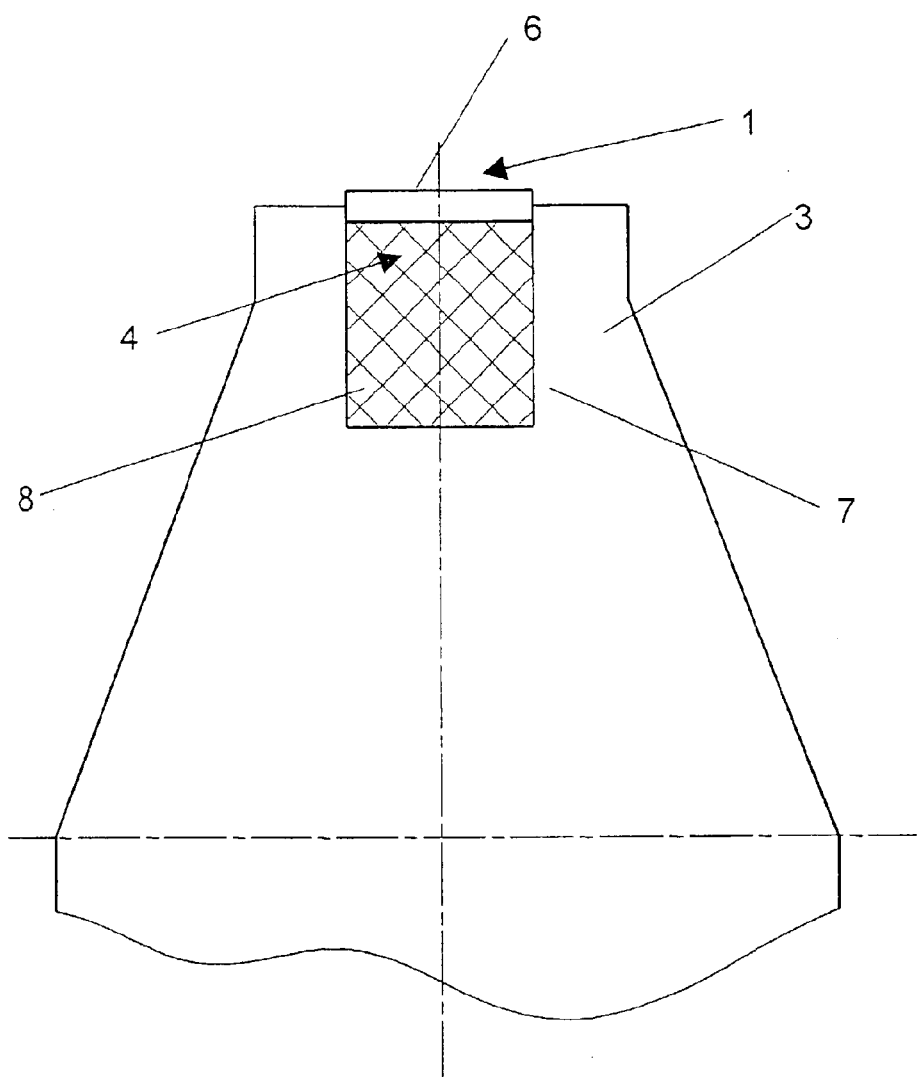
Figure 4:
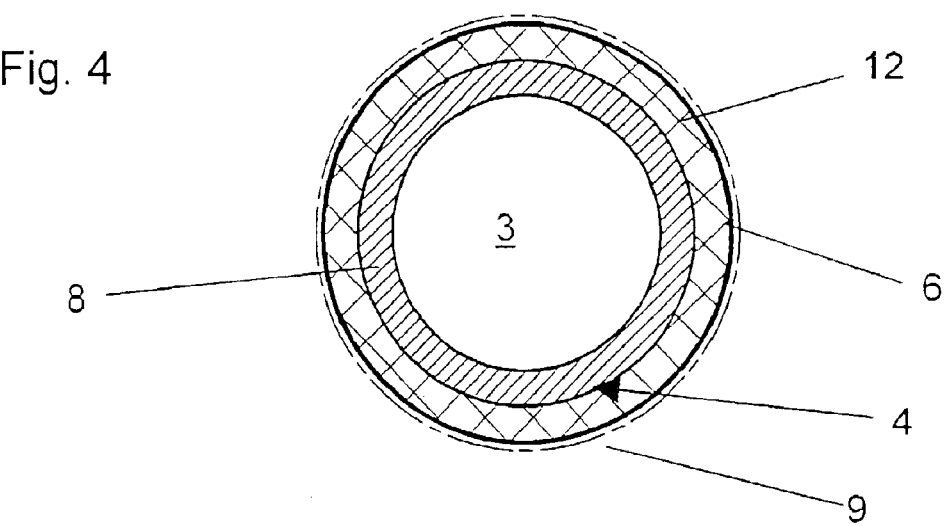
Figure 5:
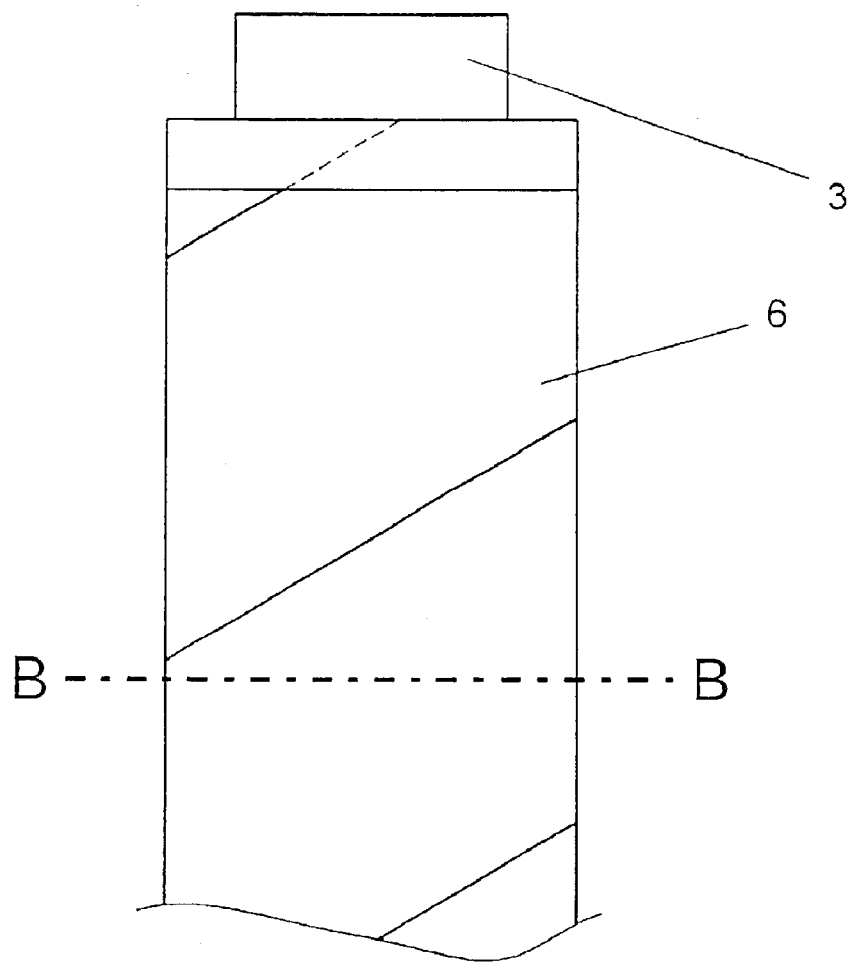

FIG. 2 a section through a first welding/separating terminal according to the invention FIG. 3 a section through a second welding/separating terminal according to the invention FIG. 4 a section through a third welding/separating terminal according to the invention FIG. 5 a view of the third welding/separating terminal according to the invention FIG. 1 shows a schematic diagram of a separating seam welding device with a welding point 1 which is defined by a welding terminal 2 and an opposing terminal 3. Both terminals are only represented schematically and as extracts. Often the opposing terminal is also heated along with the welding terminal.

As a rule, one, or even both, of the terminals 2, 3 have spring devices acting as shock absorbers, said spring devices connecting the terminals with their suspensions and absorbing the shocks arising during the separating/welding process.

As a rule, only the welding terminal is movable along the direction indicated schematically by the arrow A. However, it is just as well possible to configure both terminals, or only the opposing terminal, to be movable. It is only important for the function of the machine that the two terminals execute a relative motion or acceleration at the level of the welding/separating point, said motion or acceleration providing the force necessary for the welding and separating.

Moreover, the opposing terminal 3 is equipped with a flexible absorbing body 4. The absorbing body 4 consists, as a rule, of a flexible plastic which is as heat-resistant as possible, such as silicone or viton, and is subject to wear. In the present example, adhesion of the foil 5 to the absorbing body 4 is prevented by a Teflon/glass fabric 9 being guided through between the foil and the absorbing body. This Teflon/glass fabric 9 is wound off of the Teflon/glass fabric roll 10 and fed to the Teflon/glass fabric roll 11. The forward feed of the Teflon/glass fabric roll takes place intermittently, where the fabric is moved after one or more welding processes.

FIG. 2 shows an opposing terminal of a device according to the invention in which the flexible absorbing body 4 consists only of a spring metal sheet 13 with a metal surface 6. The spring steel sheet is, in the embodiment example of the invention, prestressed in a groove 7 in the opposing terminal.

FIG. 3 shows an additional embodiment example of the invention in which, once again in the groove 7 in the opposing terminal, a flexible material 8 forms a large part of the flexible absorbing body 4. The absorbing body also has a metal surface 6 which is turned toward the welding terminal not represented here.

Representation of the Teflon/glass fabric 9 was omitted in FIGS. 2 and 3 although such a fabric can be used particularly advantageously with the invention.

FIGS. 4 and 5 show the opposing terminal of another embodiment example of the invention in which the opposing terminal 3 is rotatably mounted. As already mentioned initially, these rotatable opposing terminals 3 are rotated between two separating/welding processes so that another part of the terminal surface is exposed to the welding temperature and the pressure of the separating/welding process. Here the rotatable opposing terminal 3 is formed as a roller. FIG. 4 shows a section B—B through such a roller which shows that around the rotatable terminal 3 a layer of a flexible material 8 such as silicone has first of all been disposed. On this layer is found a metal layer 12 with a metal surface 6 which reaches around the entire circumferential surface of the terminal 3 formed as a roller. Thus, this layer is always turned toward the welding terminal not represented even during the welding process.

In this embodiment example this metal surface 6 is provided with a Teflon/glass fabric 9 which prevents adhesion of the foil 5 to the opposing terminal 2. FIG. 5 shows a view of a part of the embodiment example already described in FIG. 4. In this view only the Teflon/glass fabric 9, one end of the opposing terminal 3, and the position of the section B—B can be seen.

| List of Reference Numbers | |
|---|---|
| 1 | Weld separation point |
| 2 | Welding terminal |
| 3 | Opposing terminal |
| 4 | Flexible absorbing body |
| 5 | Foil/foil tube |
| 6 | Metal surface of the absorbing body |
| 7 | Groove in the opposing terminal 3 |
| 8 | Flexible material |
| 9 | Teflon/glass fabric |
| 10 | Teflon/glass fabric roll |
| 11 | Teflon/glass fabric roll |
| 12 | Metal layer |
| 13 | Flexible metal sheet |
| A | Arrow in the direction of motion of the welding terminal |
| B | Cut points |

What is claimed is:

1. Device for the simultaneous separating and welding of foils or foil tubes (5)
   which comprise at least one welding terminal (2) and an opposing terminal (3),
   wherein at least a part of the surface of the opposing terminal (3) turned toward the welding terminal (2) comprises a flexible absorbing body (4)
   characterized by the fact that
   the surface of the flexible absorbing body (6) turned toward the welding terminal consists of metal.

2. Device according to claim 1,
   characterized by the fact that
   the surface of the flexible absorbing body (6) turned toward the welding terminal (2) consists of a flexible metal such as spring steel sheet.

3. Device according to claim 2,
   characterized by the fact that
   the flexible spring steel sheet (13) is deformed during the welding process.

4. Device according to claim 2, characterized by the fact that the flexible spring steel sheet (13) has already been prestressed before the welding process.

5. Device according to claim 1, characterized by the fact that the flexible absorbing body (4) comprises an additional spring element (8) on the side turned away from the welding terminal.

6. Device according to claim 5,
   characterized by the fact that
   the spring element (8) consists of an elastic plastic such as silicone or viton.

7. Device according to claim 6,
   characterized by the fact that
   the flexible spring element (8) is stamped out in the form of a band.

8. Device according to claim 7,
   characterized by the fact that
   the flexible spring element (8) stamped out in the form of a band and the metal surface (6) of the absorbing body (4) turned toward the welding terminal (2) are connected to one another.

9. Device according to claim 8,
   characterized by the fact that
   the flexible spring element (8) stamped out in the form of a band and the metal surface (6) of the absorbing body (4) turned toward the welding terminal (2) are glued to one another.

10. Device according to claim 1, characterized by the fact that between the absorbing body (4) and the foil (5) to be welded a weld-blocking layer (9) of a material such as, for example, Teflon/glass fabric (9) is disposed.

11. Process for the simultaneous separating and welding of foils or foil tubes (5)
    in which the separating/welding is done by at least one welding terminal (2) and one opposing terminal (3),
    and at least a part of the surface (6) of the opposing terminal (3) turned toward the welding terminal (2) is equipped with a flexible absorbing body (4)
    characterized by the fact that
    the surface of the absorbing body (4) turned toward the welding terminal (3) [sic] consists of metal.

* * * * *